July 2, 1935.  C. E. LUCKE  2,006,469
APPARATUS FOR MEASURING GAS TEMPERATURES
Filed April 17, 1934
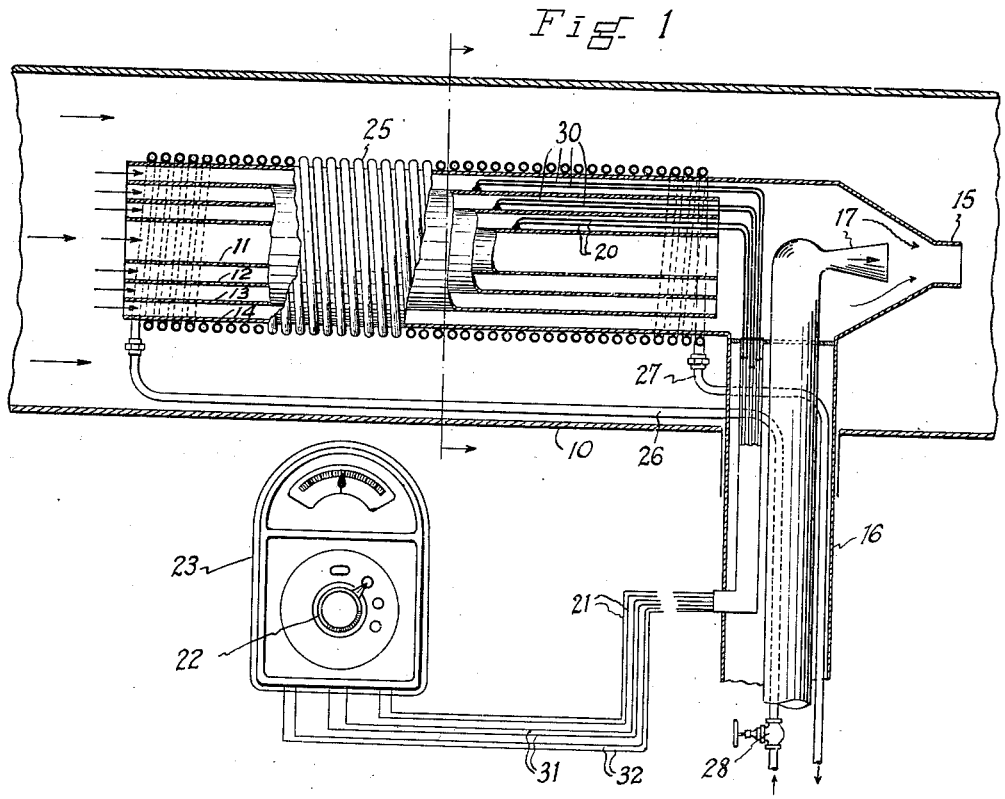
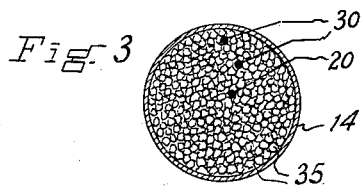
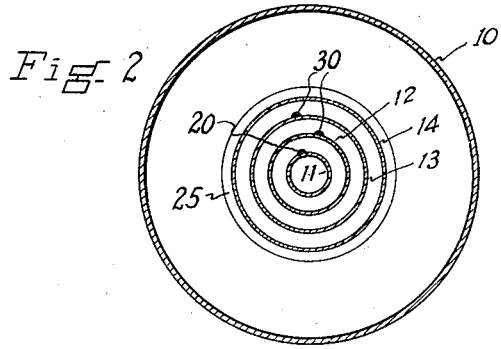
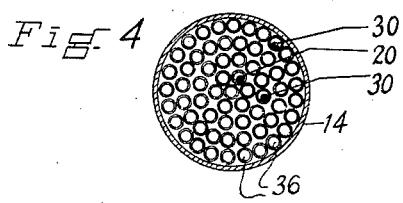
INVENTOR
*Charles E. Lucke*
BY
ATTORNEY Patented July 2, 1935

2,006,469

UNITED STATES PATENT OFFICE 2,006,469

APPARATUS FOR MEASURING GAS TEMPERATURES

Charles E. Lucke, New York, N. Y.

Application April 17, 1934, Serial No. 720,922

8 Claims. (Cl. 73—32)

My present invention relates in general to the measurement of gas temperatures, and, more specifically, to apparatus for measuring the temperature of a gas at a point "in sight of" a body or wall surface at a temperature different from the gas temperature, i. e., in position to radiate heat to or receive heat by radiation from a body located at that point, depending upon which is at the higher temperature.

In the temperature measurement of a gas in sight of a surface at a different temperature, it has been found that there is ordinarily an error of from 5 to 25% in such temperature readings, chiefly due to radiation effects. For example, if a temperature measuring instrument is immersed in a hot gas in sight of a relatively cool surface, the instrument will absorb heat by convection from the gas and its temperature will rise. Gases being permeable to radiation, as soon as the temperature of the instrument exceeds that of the surface, heat passes from the instrument to the surface through the gas by radiation. The temperature of the instrument will continue to rise with a decreasing rate until the quantity of heat given off by radiation equals the quantity received by convection. The temperature of the instrument will then remain constant, but will be below the real temperature of the gas. The magnitude of the error in the instrument reading will be largely dependent upon the difference between the temperature of the gases and the surrounding surfaces.

The general object of my invention is the provision of improved apparatus for measuring the temperature of a gas at a point in sight of a surface at a different temperature. A further and more specific object is the provision of gas temperature measuring apparatus in which the radiation error is eliminated or reduced to a negligible quantity.

The various features of novelty which characterize my invention are pointed out with particularity in the claims annexed to and forming a part of this specification. For a better understanding of the invention, its operating advantages and specific objects attained by its use, reference should be had to the accompanying drawing and descriptive matter in which I have illustrated and described preferred embodiments of my invention.

Of the drawing:

Fig. 1 is a somewhat diagrammatic view illustrating an elevation mainly in section of one form of measuring apparatus constructed in accordance with my invention;

Fig. 2 is a section on the line 2—2 of Fig. 1; and

Figs. 3 and 4 are views similar to Fig. 2 illustrating modified constructions.

In accordance with my invention, accurate temperature measurments of a gas at points in sight of a surface at a temperature substantially different from the gas temperature are obtained by first compensating for or neutralizing heat radiation between the measuring device and the surface, thereby substantially eliminating the radiation error. Neutralization of such heat radiation is obtained by establishing a regulable counter-radiation in the space between the measuring device and the surface and regulating the same until the counter-radiation is sufficient to neutralize radiation between the measuring device and surface.

In Figs. 1 and 2, I have illustrated one form of apparatus suitable for gas temperature measurement. As shown, the apparatus is in use for measuring the temperature of a gas flowing in an enclosure or conduit 10, the boundary walls of which are normally at a temperature substantially different from the enclosed gas. The temperature measuring device employed comprises a series of concentric cylindrical casings 11, 12, 13 and 14, having their axes arranged in the line of gas flow. The casings are preferably separated by suitable thermally insulated supports (not shown) and the outer casing 14 mounted on a hollow standard 16 extending through a wall of the enclosure 10. The rear end of the outer casing 14 is progressively tapered and in line with the restricted outlet 15 so formed is positioned the discharge end of a regulable steam or air ejector nozzle 17 arranged to facilitate the gas flow through the casings.

The casings 11, 12, 13, and 14 are intended to successively interrupt heat radiation between any temperature measuring device positioned therein and the walls of the enclosure 10. Any suitable form of temperature measuring device may be used, a thermocouple pyrometer being preferred because of its relatively small amount of radiating surface. As shown, a thermocouple 20 is positioned in the annular space between the casings 11 and 12 with its hot junction attached to the casing 11. The elements of the thermocouple are connected at a cold junction in the standard 16 to leads 21 terminating in a rotary switch 22 of a suitable temperature indicating instrument 23, preferably in the form of a potentiometer located externally of the enclosure 10.

With this arrangement and with the walls at a substantially lower temperature than the enclosed gas, the casings 12, 13 and 14 will be at progressively lower temperatures intermediate the temperatures of the casing 11 and the walls due to the heat radiation between the outer casing and the walls and the radiation between each of the inner casings and the next outer casing. The casings 12, 13 and 14 thus serve as solid interceptors of radiant heat rays between a body, here the casing 11 and thermocouple 20, at the desired point of temperature measurement and the surface at a different temperature. The casings thus act to reduce radiation losses to some extent from the point of temperature measurement and may be made of metal or other suitable material. When so arranged and attached to the casing 11, the thermocouple will measure the temperature of the casing 11, which for the foregoing reason will be at a temperature somewhat lower than the actual temperature of the gas contacting therewith. With the walls of the enclosure 10 at a higher temperature than the enclosed gas, the radiation is in the reverse direction and due to such radiation, the temperature reading will be higher than the actual gas temperature.

In order to eliminate or render negligible such radiation losses, I have provided means for establishing a regulable counter-radiation in the space between the outer casing 14 and the enclosure walls and other means for accurately determining the proper amount of counter-radiation. In the embodiment illustrated, the counter-radiation means or radiation neutralizer consists of a pipe coil 25 mounted on the outer casing 14 and having inlet and outlet connections 26 and 27 respectively thereto. When the heat radiation is to the enclosure walls, a heating fluid will be delivered to the pipe coil from a suitable source; and when the heat radiation is to the point of temperature measurement, a cooling fluid will be supplied. In either case, the amount of counter-radiation fluid can be regulated by a control valve 28.

Since the amount of counter-radiation required to neutralize radiation varies substantially in accordance with the temperature differential between the gas and enclosure walls, and an oversupply of counter-radiation might result in a greater measurement error than no supply, I have provided means for accurately determining the proper amount of counter-radiation. In the present embodiment, one or more counter-radiation control thermocouples 30 are positioned in the space between the thermocouple 20 and the pipe coil 25 and arranged to be operatively connected to the potentiometer 23 through the rotary switch 22. Two such control thermocouples 30 are shown mounted on the casings 12 and 13 with their elements connected at cold junctions in the standard 16 to leads 31 and 32 respectively leading to the switch 22.

The thermocouples 30 are thus constructed similarly to the thermocouple 20 and arranged to have a substantially similar heat transfer relation with the gas being measured, so that except for the intervening radiant heat interceptors all of the thermocouples would indicate substantially the same temperature.

With the apparatus constructed and arranged as described, the gas to be measured is caused to flow through the casings. With the gas at a higher temperature than the enclosure walls, heat radiation will occur between the parts immersed in the gas and the enclosure walls. The various thermocouples are successively operatively connected to the potentiometer 23 by operating the switch 22 and the relative temperature readings indicate the direction of heat radiation. The counter-radiation fluid is then supplied to the coil 25 to set up a counter-radiation in the desired direction. Readings at the various points of measurement are constantly taken and the supply of counter-radiation fluid varied until the temperature readings at all of the points of measurement are the same value. With those conditions existing, the radiation losses will be neutralized and the common temperature will be the true gas temperature. The regulation of the counter-radiation under this method is thus in accordance with the temperature differential at opposite sides of a solid body intercepting radiant heat rays between the point of measurement and the surface at a different temperature. Suitable means may be provided for automatically regulating the amount of counter-radiation in accordance with that temperature differential and recording the common temperature.

The radiant heat interceptor employed may be in other forms than one or more concentric casings. In Fig. 3, a modification of the interior of the casing 14 is illustrated and in which the casing 14 is filled with granular material 35, and one or more of the control thermocouples 30 are positioned therein between the thermocouple 20 at the desired point of temperature measurement and the casing 14. In the construction shown in Fig. 4, the casing 14 is filled with tubes 36 of small cross-sectional area with their axes arranged in the line of gas flow through the casing. A measuring thermocouple 20 and one or more control thermocouples 30 are positioned in radially spaced tubes 36. The previously described method of measurement may be carried out as set forth with the described modifications.

While in accordance with the provisions of the statutes I have illustrated and described herein the best forms of my invention now known to me, those skilled in the art will understand that changes may be made in the form of the apparatus disclosed without departing from the spirit of the invention covered by my claims, including other forms of temperature responsive devices and counter-radiation devices, and that certain features of my invention may sometimes be used to advantage without a corresponding use of other features.

I claim:

1. Gas temperature measuring apparatus comprising in combination a temperature responsive device, a solid radiant heat interceptor at one side of said temperature responsive device, a second temperature responsive device at the opposite side of said interceptor from said first temperature responsive device, and counter-radiation means at said opposite side of said interceptor and beyond said second temperature responsive device.

2. Gas temperature measuring apparatus comprising in combination a temperature responsive device, a solid radiant heat interceptor at one side of said temperature responsive device, a second temperature responsive device at the opposite side of said interceptor from said first temperature responsive device, regulable counter-radiation means at said opposite side of said interceptor and beyond said second temperature responsive device, means for regulating said counter-radiation means, and means for indicating the temperature measurements of said temperature responsive devices.

3. Gas temperature measuring apparatus comprising in combination a temperature responsive device, a radiant heat intercepting casing surrounding said temperature responsive device, a second temperature responsive device at the outer side of said casing, counter-radiation means at the outer side of said casing and beyond said second temperature responsive device, and means for indicating the temperature measurements of said temperature responsive devices.

4. Gas temperature measuring apparatus comprising in combination a temperature responsive device, a series of concentric radiant heat intercepting casings surrounding said temperature responsive device, a second temperature responsive device positioned between two of said casings, counter-radiation means arranged to surround said casings, means for regulating said counter-radiation means, and means for indicating the temperature measurements of said temperature responsive devices.

5. Gas temperature measuring apparatus comprising in combination a temperature responsive device, a solid radiant heat interceptor at one side of said temperature responsive device, a second temperature responsive device at the opposite side of said interceptor from said first temperature responsive device, ejector means for causing a gas flow in contact with said interceptor and temperature responsive devices, counter-radiation means at said opposite side of said interceptor and beyond said second temperature responsive device, means for regulating said counter-radiation means, and means for indicating the temperature measurements of said temperature responsive devices.

6. Gas temperature measuring apparatus comprising in combination a temperature responsive device, a solid radiant heat interceptor at one side of said temperature responsive device, a second temperature responsive device at the opposite side of said interceptor from said first temperature responsive device and arranged to have substantially the same heat transfer relation with the gas to be measured as said first temperature responsive device, and counter-radiation means at said opposite side of said interceptor and beyond said second temperature responsive device.

7. Apparatus for measuring the temperature of a gas at a point in sight of a surface at a temperature different from the gas comprising a temperature responsive device, a solid radiant heat interceptor between said temperature responsive device and the surface, a second temperature responsive device between said interceptor and the surface and arranged to have substantially the same heat transfer relation with the gas as said first temperature responsive device, and regulable counter-radiation means between said second temperature responsive device and the surface.

8. In a gas casing, gas temperature measuring apparatus comprising a pair of temperature responsive devices constructed and arranged to have substantially similar heat transfer relations with the gas in said casing, a solid radiant heat interceptor between only one of said temperature responsive devices and said casing, and regulable counter-radiation means between said second temperature responsive device and said casing.

CHARLES E. LUCKE.